United States Patent

[11] 3,628,427

[72] Inventor John M. Bailey
Dunlap, Ill.
[21] Appl. No. 25,966
[22] Filed Apr. 6, 1970
[45] Patented Dec. 21, 1971
[73] Assignee Caterpillar Tractor Co.
Peoria, Ill.

[54] COMBUSTION GAS SEAL
7 Claims, 3 Drawing Figs.
[52] U.S. Cl. ...................................... 92/144,
92/169, 92/171, 123/193 CH
[51] Int. Cl. ........................................... F01b 31/08
[50] Field of Search............................................ 92/144,
171, 169; 123/41.84, 193, 193 CH

[56] References Cited
UNITED STATES PATENTS
3,363,608 1/1968 Scherenberg................. 123/193 CH

| 3,463,056 | 8/1969 | Moore | 92/171 |
| 2,155,180 | 4/1939 | Caldwell | 92/171 |
| 3,139,009 | 6/1964 | Harting | 92/171 |
| 2,856,249 | 10/1958 | Leman | 92/171 |
| 3,432,177 | 3/1969 | Colwell | 92/171 |
| 3,209,659 | 10/1965 | Colwell | 92/171 |
| 3,410,256 | 11/1968 | Herschmann | 123/193 |

*Primary Examiner*—Martin P. Schwadron
*Assistant Examiner*—Ronald H. Lazarus
*Attorney*—Fryer, Tjensvold, Feix, Phillips & Lempio ABSTRACT: A seal for effectively sealing an engine cylinder liner and cylinder head against gas leakage from a cylinder combustion chamber. The seal is arranged to reduce the gas pressure and heat loads acting on a conformable and resilient sealing element to provide improved sealing with the ability to utilize lower cost sealing materials.

PATENTED DEC 21 1971  3,628,427
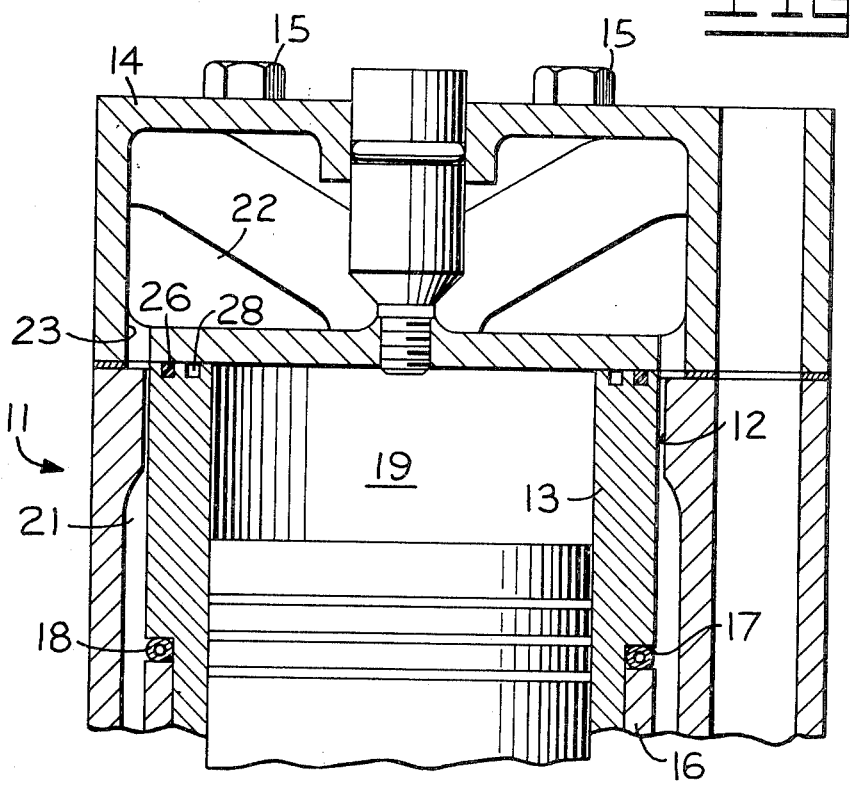
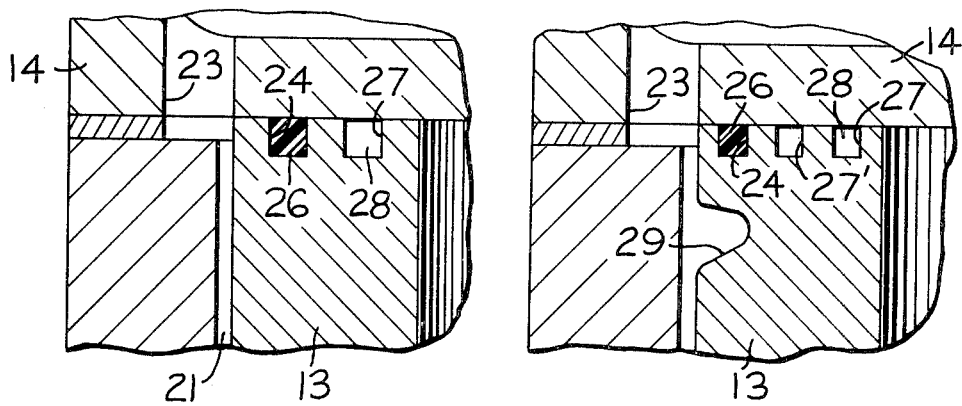
INVENTOR
JOHN M. BAILEY
BY
Fryer, Tjensvold, Feix, Phillips & Lempio
ATTORNEYS

COMBUSTION GAS SEAL

BACKGROUND OF THE INVENTION

Seals for combustion gases are generally compressed between the cylinder liner and cylinder head or between the cylinder block and cylinder head and are dependent on the torque loads used when securing the cylinder head to the cylinder block.

As engine power has increased, sealing between the head and block has become more difficult and additional torque has been required at assembly to insure sealing. However tightening to a greater torque to prevent seal leakage has resulted in greater stresses in the cylinder liner flanges and ledge areas leading to crack damage to the liner or block. Consequently, various arrangements have been devised to limit the loads acting upon the cylinder liners while providing more efficient seals.

In accordance with one of these arrangements a thin-walled sleeve cast integrally with the cylinder block supports a cylinder to bear directly against the cylinder head so as to provide intimate metal-to-metal contact therebetween, a yieldable spacer being disposed between the sleeve and liner to eliminate the need for selective assembly.

Combustion gases are sealed by means of a conformable and resilient sealing element compressed into a circumferential groove formed in the upper face of the liner. With this and other arrangements having intimate metal-to-metal contact between the parts, a primary seal is provided by the abutting parts. However, relatively slight machining imperfections in the seal faces permit some gas leakage to occur, especially during periods of high cylinder pressure. The sealing element then seals against the gas leakage. Although an effective seal is provided, the gas load and heat acting on the sealing element are such as to require the use of relatively exotic and expensive seal materials to insure suitable reliability and life.

SUMMARY OF THE INVENTION

The general object of the present invention is to provide an improved combustion gas seal wherein the gas load acting on a conformable and resilient sealing element is greatly reduced and heating of the element is minimized. As an advantageous result a highly effective seal is obtained with relatively inexpensive seal materials.

In the accomplishment of the foregoing, as well as other objects and advantages of the invention, a seal is provided between abutting faces of a cylinder liner and cylinder head, or similar members, which seal generally comprises means supporting the faces in intimate metal-to-metal contact, means defining a circumferential seal groove in a first of the faces concentric with reference to the cylinder combustion chamber, a conformable resilient sealing element disposed in the seal groove and compressed between the faces, and means defining at least one concentric circumferential surge groove in the first face radially inward from the seal groove.

The surge chamber defined by the surge groove in the first face and intimately contacting second face receives the small amount of gas which may flow between the faces under high-pressure conditions in the combustion chamber to thereby reduce the gas load acting on the sealing element. The surge chamber also functions as a heat dam to reduce heat conduction to the sealing element and to break the flow of hot gases to prevent their direct impingement against the sealing element.

BRIEF DESCRIPTION OF THE DRAWING

FIG. 1 is a sectional view of a cylinder block, liner, and head assembly embodying a combustion gas seal in accordance with the present invention.

FIG. 2 is a fragmentary enlarged sectional view of a portion of the assembly of FIG. 1 depicting the seal.

FIG. 3 is a view similar to FIG. 2, depicting a modified form of the seal.

DETAILED DESCRIPTION OF THE PREFERRED EMBODIMENTS OF THE INVENTION

Referring now to the drawing, FIG. 1 in particular, there is shown an engine cylinder block 11 having a cylinder bore 12 with a cylinder liner 13 disposed therein. A cylinder head 14 is secured to the top surface of the block, as by means of head bolts 15.

Means are provided to support the liner 13 with its top face in intimate metal-to-metal contact with the bottom face of head 14. In this regard, the liner support means preferably include a thin-walled sleeve 16 formed integrally with the block 11 to project upwardly into the cylinder bore 12. The sleeve circumscribes the lower portion of the liner, and an annular circumferential shoulder 17 formed at an intermediate location of the liner periphery is seated on the upper end of the sleeve. An annular yieldable spacer 18 is preferably interposed between the sleeve end and shoulder in order to provide the desired support of the liner in intimate contact with the head without requirement of selective assembly.

To facilitate cooling of the cylinder combustion chamber 19 defined within cylinder liner 13, the wall of cylinder bore 12 is milled to define a cooling jacket 21 about the liner for circulating coolant in direct contact with the outer peripheral surface thereof. The jacket extends adjacent the upper end of the liner and is thereat communicated with a head-cooling jacket 22 as by means of coolant passages 23 provided in the head. Sealing of the intimately contacting end faces of the liner 13 and head 14 against the outflow of combustion gases from chamber 19 and in flow of coolant from cooling jacket 21 is accomplished by means of a novel seal in accordance with the present invention. As most clearly illustrated in FIG. 2, the inventive seal includes a circumferential seal groove 24 preferably formed in the upper end face of the liner. Such groove serves to receive a conformable and resilient annular sealing element 26 which is compressed between the intimately contacting seal faces of the liner 13 and head 14.

In accordance with the particularly salient aspects of the invention a concentric circumferential surge groove 27 is additionally provided radially inwardly of the seal groove 24. Like the seal groove 24, the surge groove 27 is also preferably formed in the upper end face of the liner. The surge groove 27 in conjunction with the abutting seal face of the head 14 define a surge chamber 28 interposed between the combustion chamber 19 and sealing element 26 in the gas leakage path between the seal faces of the head and liner. It will of course be appreciated that alternatively the grooves 24 and 27 may be formed in the seal face of the head.

In the operation of the seal of the present invention, the seal faces of the liner 13 and head 14 in intimate metal-to-metal contact provide a primary seal against gas leakage from the combustion chamber 19. However, relatively slight machining imperfections in the seal faces allow some gas leakage to occur, especially during periods of high cylinder pressure. During these periods gas leakage will be to surge chamber 28, creating a small pressure rise therein having a magnitude dependent on the size of leakage path and volume of the surge chamber. Any gas flow from the surge chamber is prevented by the sealing element 26.

As combustion chamber pressures decrease, they become less than the pressure existing in the surge chamber and the gases accumulated therein flow back to the combustion chamber. Since high cylinder pressure occurs only for a relatively few degrees of the cycle and much lower pressure exists for the remainder of the cycle, the pressure in the surge chamber reaches an equilibrium at an average pressure much lower than the peak cylinder pressure. A pressure fluctuation occurs about the average pressure, the fluctuation being a function of the flow path size and the volume contained in the surge chamber.

Consequently, the static and dynamic pressure loads which would otherwise act on the sealing element 26 are substantially lowered because of the presence of the surge chamber 28 between the combustion chamber 19 and the sealing element functioning to absorb the loads. Moreover, the discontinuity defined in the liner face by the surge chamber acts as a last dam to reduce heat conduction to the sealing element and serves to break up and dissipate the flow of hot combustion gases to thereby prevent their direct impingement against the sealing element.

The sealing element 26 is further cooled by its proximity to the coolant in cooling jacket 21 which is in direct contact with the outer periphery of the liner 13. In fact the arrangement is such that the sealing element assumes a temperature very little above that of the coolant. By virtue of the reductions in the combustion gas pressure load and temperature acting on the sealing element afforded by the surge chamber, substantially less exotic and expensive sealing materials may be employed in the sealing element than have been heretofore required to provide as effective a seal.

As shown in FIG. 3, the seal may be modified to include additional concentric surge chamber defining grooves 27' in the seal face of the liner 13 radially inward of the seal groove 24. The additional grooves provide increased capacity for the absorption of combustion gas pressure and further reduction of heat conduction to the sealing element 26.

As a further modification, a circumferential groove 29 may be formed in the periphery of the liner 13 in closely adjacent undercutting relation to the seal groove 24. The groove 29 is in direct contact with the coolant in cooling jacket 21 and may be consequently employed to provide increased cooling of sealing element 26 in the event it is required.

Although the invention has been hereinbefore described and illustrated in the accompanying drawing with respect to what may be considered preferred embodiments of the invention, various modifications and changes may be made therein without departing from the true spirit and scope of the invention, and thus it is not intended to limit the invention except by the terms of the appended claims.

What is claimed is:

1. A combination gas seal comprising first and second members defining a cylinder combustion chamber and respectively having abutting first and second planar seal faces radially outward of the chamber, said faces defining therebetween a combustion gas leakage path from said chamber, means forcing said faces into intimate metal-to-metal contact, means defining a circumferential seal groove in said first face outwardly concentric with reference to said combustion chamber, a conformable continuous resilient annular sealing element disposed in said seal groove and compressed between said faces, and means defining at least one concentric circumferential surge groove in said first face radially inward from said seal groove, each surge groove defining with said second face a surge chamber in said combustion gas leakage path intermediate said combustion chamber and said sealing element to reduce the combustion gas pressure and heat loads acting on said sealing element.

2. A combustion gas seal according to claim 1, further defined by a cooling jacket disposed outwardly of said first member for circulating coolant in direct contact with the outer peripheral surface thereof adjacent said first face.

3. A combustion gas seal according to claim 2, further defined by said first member having a circumferential cooling groove in the outer peripheral surface thereof in closely adjacent undercutting relation to said seal groove in said first face, said cooling groove being in communication with said jacket to circulate said coolant in close proximity to said sealing element.

4. A combustion gas seal according to claim 1, further defined by said first member being a cylinder liner disposed in a cylinder bore of a block and defining with the bore wall a cooling jacket extending adjacent the upper end of said liner, and said second member being a cylinder head secured to said block, said first and second seal faces being respectively the top end face of said liner and bottom face of said head.

5. A combustion gas seal according to claim 4, further defined by said liner having a circumferential groove in the outer peripheral surface thereof in closely adjacent undercutting relation to said seal groove.

6. A combustion gas seal according to claim 4, further defined by said means supporting said faces in intimate metal-to-metal contact comprising a sleeve formed integrally with said block to project upwardly into said cylinder bore, means defining a shoulder on the periphery of said liner at an intermediate location thereof, said sleeve circumscribing the lower portion of said liner with said shoulder seated on the upper end of said sleeve, and a yieldable annular spacer interposed between the upper end of said sleeve and said shoulder.

7. A combustion gas seal according to claim 6, further defined by said liner having a circumferential groove in the outer peripheral surface thereof in closely adjacent undercutting relation to said seal groove.

* * * * *